United States Patent

Shirao et al.

[11] Patent Number: 5,355,041
[45] Date of Patent: Oct. 11, 1994

[54] MAGNETIC BEARING APPARATUS

[75] Inventors: Yuji Shirao; Eishi Marui; Mamoru Suzuki, all of Kanagawa, Japan

[73] Assignee: Ebara Corporation, Tokyo, Japan

[21] Appl. No.: 38,979

[22] Filed: Mar. 29, 1993

[30] Foreign Application Priority Data

Apr. 1, 1992 [JP] Japan ................................ 4-108590

[51] Int. Cl.[5] ............................................. H02K 7/09
[52] U.S. Cl. .................................. 310/90.5; 310/68 B; 324/207.16
[58] Field of Search ..................... 310/90.5, 68 B; 324/207.16, 207.25

[56] References Cited

U.S. PATENT DOCUMENTS

| | | |
|---|---|---|
| 4,683,111 | 7/1987 | Helm et al. |
| 4,683,391 | 7/1987 | Higuchi ................. 310/90.5 |
| 4,774,424 | 9/1988 | Habermann ............ 310/90.5 |
| 5,093,754 | 3/1992 | Kawashima ........... 310/90.5 |

FOREIGN PATENT DOCUMENTS

| | | |
|---|---|---|
| 2163152 | 6/1973 | France . |
| 2239038 | 2/1975 | France . |
| 2570488 | 3/1986 | France . |
| 24645 | of 0000 | Japan . |
| 153013 | of 0000 | Japan . |
| 2192041A | 12/1987 | United Kingdom . |

OTHER PUBLICATIONS

English Abstract of J.P. Public Disclosure No. 153013/86.
English Abstract of Japanese application No. 60-175823, filed Sep. 10, 1984.

Primary Examiner—R. Skudy
Attorney, Agent, or Firm—Armstrong, Westerman, Hattori, McLeland & Naughton

[57] ABSTRACT

A radial magnetic bearing apparatus suspends a rotating shaft and stably operates at a level exceeding a bending intrinsic vibration value of the rotating shaft by controlling magnetic forces generated by control coils wound around control magnetic poles. Grooves are provided on the surface of each control magnetic pole facing the rotating shaft, and sensor coils are wound to pass through the grooves in order to detect the position of the rotating shaft in the radial direction. A part of each control magnetic pole may be used as magnetic poles of an inductance-type displacement sensor.

7 Claims, 6 Drawing Sheets

MAGNETIC BEARING APPARATUS

BACKGROUND OF THE INVENTION:

1. Field of the Invention

The present invention relates to a radial magnetic bearing apparatus for suspending a magnetic object by controlling a magnetic force with electromagnets, and, particularly, to the structure of control magnetic poles of the electromagnets.

2. Description of the Prior Art

FIG. 1 is a sectional view of a radial magnetic bearing apparatus of the prior art. A control magnetic pole core 1 is provided with control magnetic poles 31, 32, 35 and 36 around which control coils 51, 52, 55 and 56 are wound. An object made of a magnetic material, for example, a rotating shaft 8, is suspended in a direction X under a control force of electromagnets by control magnetic poles and control coils. The generated control magnetic poles 31 and 32 form a pair. The respective control coils 51 and 52 are wound to form different magnetic poles so that the magnetic fluxes formed by these coils are closed. Therefore, a pair of control magnetic poles 31 and 32 attract the rotating shaft 8 in the +X direction. On the other hand, a pair of control magnetic poles 35 and 36 provided opposite to the control poles 31 and 32 also attract the rotating shaft 8 in the −X direction. As a result, the rotating shaft 8 is positioned and supported in the direction X without any contact with the control magnetic poles 31, 32, 35 and 36 by balancing the magnetic force generated by the electromagnets. In the same manner, the rotating shaft 8 is also positioned and supported in the direction Y without any contact with the control magnetic poles 33, 34, 37 and 38 by balancing the magnetic force generated by the electromagnets comprising a pair of control magnetic poles 33 and 34 and a pair of control poles of 37 and 38.

A pair of control poles located at a position opposite to a pair of control poles provided with control coils supports the rotating shaft 8 in a balanced position under a magnetic force generated by these electromagnets. As such, it is necessary to control excitation of the control coils by detecting the position of the rotating shaft, in order to balance the magnetic forces generated by the electromagnets. To this end, an inductance-type displacement sensor is usually provided adjacent to each control magnetic pole to detect the radial position of the rotating shaft 8. This sensor has a magnetic pole similar to the control magnetic pole and around which a sensor coil is wound for detecting a change in inductance.

FIG. 2 is a sectional view of inductance-type displacement sensors provided in the radial magnetic bearing apparatus shown in FIG. 1. The inductance-type displacement sensors comprise sensor magnetic poles 41 to 48 and sensor coils 61 to 68 wound around the sensor magnetic poles. The position of the rotating shaft 8 in the direction X can be detected by measuring a ratio of inductance of a pair of sensor coils 61 and 62 wound around the magnetic poles 41 and 42, respectively, and the inductance of a pair of sensor coils 65 and 66 wound around the magnetic poles 45 and 46 located opposite to the magnetic poles 41 and 42 with respect to the rotating shaft. The position of the rotating shaft 8 in the direction Y is detected by measuring a ratio of the inductances of the sensor coils 63, 64, 67, 68 in a similar manner.

FIG. 3 is a sectional view of the radial magnetic bearing apparatus shown in FIG. 1. As shown in FIG. 3, displacement detecting points of the inductance-type displacement sensor comprising the sensor magnetic pole 41 around which the sensor coil 61 is wound and the inductance-type displacement sensor comprising the sensor magnetic pole 45 around which the sensor coil 65 is wound are located by ΔL below in the axial direction of the rotating shaft 8 from working points of the control magnetic pole 31 and the control magnetic pole 35, respectively.

However, such a conventional magnetic bearing apparatus having control magnetic poles and magnetic poles of inductance-type displacement sensors, when operated at a level above the intrinsic value of bending vibration of the rotating shaft 8 results in oscillation which is impossible to control. FIG. 4 is a diagram explaining a bending mode vibration at the intrinsic value of bending vibration of the rotating shaft 8. In FIG. 4, positions AA′ and CC′ indicate the position of the working point of the control magnetic poles, while positions BB′ and DD′ indicate the position of poles of the displacement sensors. The control magnetic pole positions AA′ and CC′ are displaced by ΔL from the magnetic pole positions BB′ and DD′ of the displacement sensors as shown in FIG. 3.

Under a normal control condition, the rotating shaft 8 is straight as indicated by symbol 8a, but under conditions of vibration occurring at the bending intrinsic value, the shaft 8 is bent as indicated by symbol 8b. Therefore, since each displacement sensor detects a displacement at the position separated by ΔL from the position of the control magnetic pole under vibration occurring at the bending intrinsic value, the displacement sensor may erroneously indicate that a control force is required to be exerted upwardly, although a control force exerted downwardly is essentially required at the operating point of the control magnetic pole. In such a case, since an exciting current flows into the control magnetic pole to generate a control force exerted upwardly, the rotating shaft 8 is driven to an oscillating condition, resulting in a loss of control on the magnetic bearing apparatus.

Such oscillating and no control conditions may be avoided by conforming the position of the operating point of each control magnetic pole with the position of a corresponding magnetic pole of the displacement sensor. However, conventional displacement sensors consist of magnetic sensors, except for optical sensors or electrostatic capacitance-type sensors. Accordingly, if an inductance-type displacement sensor is mounted near a control magnetic pole, the displacement sensor generates an error signal by magnetic fields generated by the control pole.

On the other hand, an optical sensor is very expensive and is not desirable from the point of view of cost. Moreover, since control magnetic poles generate heat due to exciting currents, electrostatic capacitance-type sensors which are easily influenced by a change in temperature can not be employed.

SUMMARY OF THE INVENTION:

It is therefore an object of the present invention to provide a magnetic bearing apparatus wherein inductance-type displacement sensors are not influenced by magnetic forces generated by control magnetic poles.

In order to achieve the object described above, the present invention provides a radial magnetic bearing apparatus for suspending an object from control magnetic poles facing the object, comprising sensor coils for detecting the position of the object in a radial direction to be wound to pass grooves provided on end surface of each control magnetic pole thereby using a position of the control magnetic pole as magnetic poles of an inductance-type displacement sensor.

The inductance-type displacement sensor having such sensor coils operates at an operating point of the corresponding control magnetic pole. If a magnetic bearing apparatus of the prior art is operated at a level exceeding the intrinsic value of bending vibration of the suspended object, a problem occurs that the position of a displacement sensor is separated from the position of a corresponding control magnetic pole. The present invention can overcome that problem. The position of the suspended object can be detected at the operating point of each control magnetic pole, and a control force required by each control magnetic pole can be determined accurately. As a result, the radial magnetic bearing apparatus can be operated stably at a level exceeding the intrinsic value of bending vibration of the suspended object.

Grooves may be provided on end surface of a control magnetic pole in a circumferential direction or axial direction of the suspended object.

One end surface of a control magnetic pole may be provided with a plurality of grooves. Sensor coils are wound passing through such grooves, Adjacent two sensor coils are connected in series to generate magnetic fields in opposite directions, A plurality of pairs of control magnetic poles exert magnetic forces on the suspended object in the same direction and the sensor coils provided on the plurality of pairs of control magnetic poles are connected in series, Adjacent two sensor coils of adjacent two control magnetic poles are connected to form the same magnetic pole on the same side thereof.

BRIEF DESCRIPTION OF THE DRAWINGS:

Other features and advantages of the present invention will be apparent from the following description taken in connection with the accompanying drawings wherein.

Figure 1:
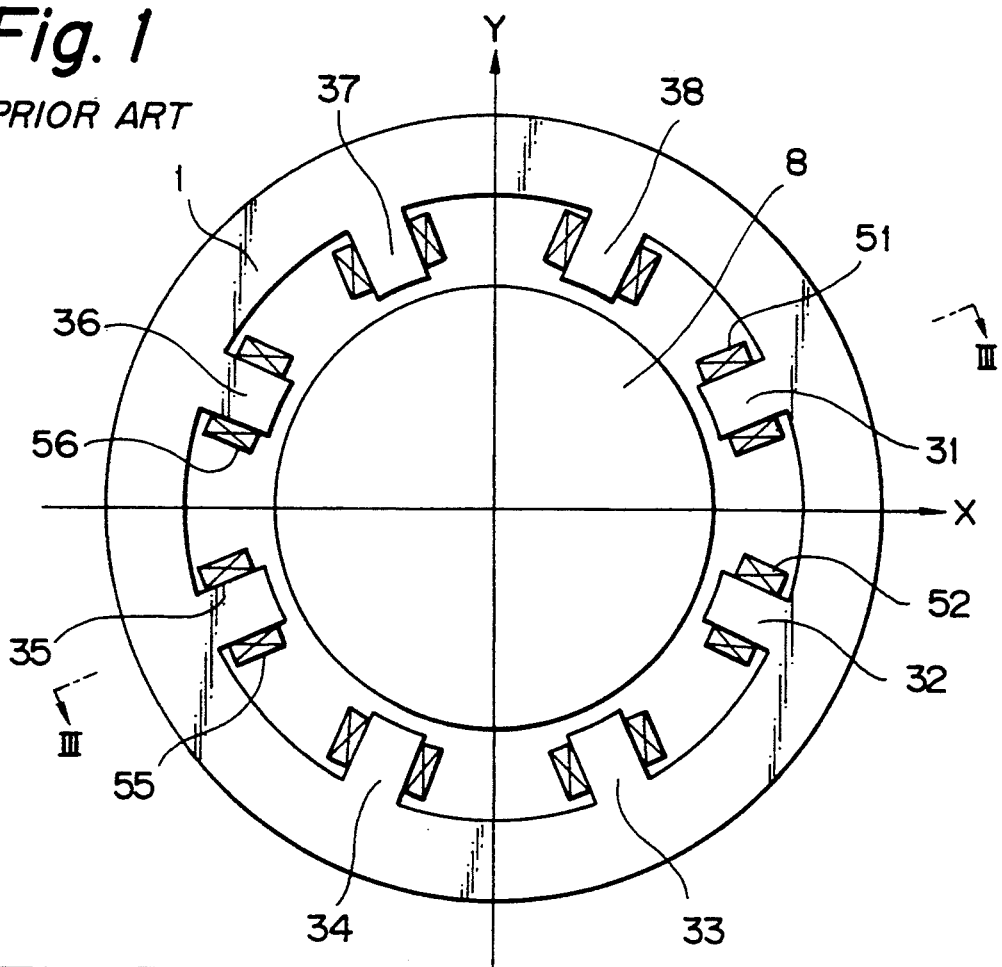
FIG. 1 is a sectional view of a radial magnetic bearing apparatus of the prior art.
Figure 3:
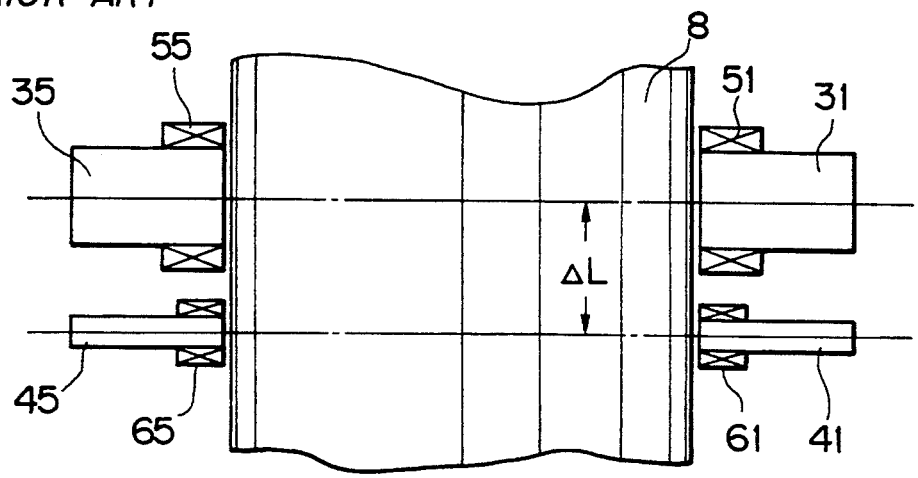
FIG. 3 is a sectional view of the radial magnetic bearing apparatus taken along the line III—III shown in FIG. 1.
Figure 2:
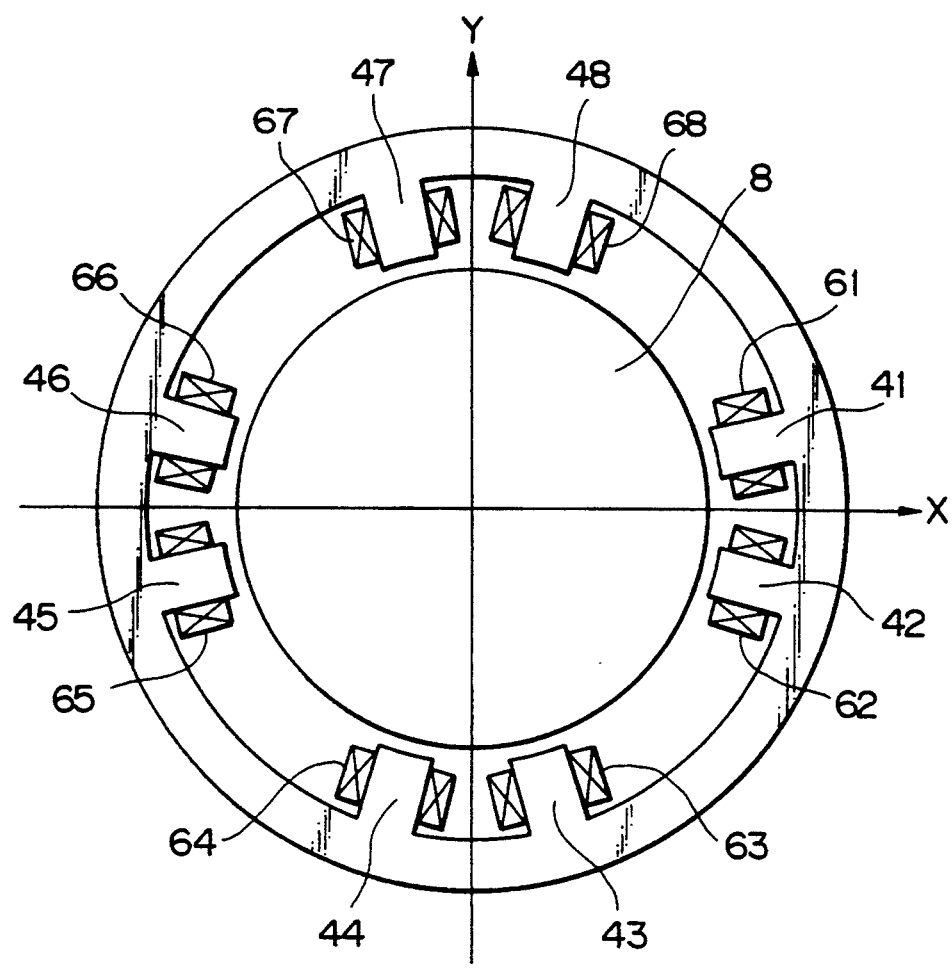
FIG. 2 is a sectional view of inductance-type displacement sensors provided in the magnetic bearing apparatus shown in FIG. 1.
Figure 4:
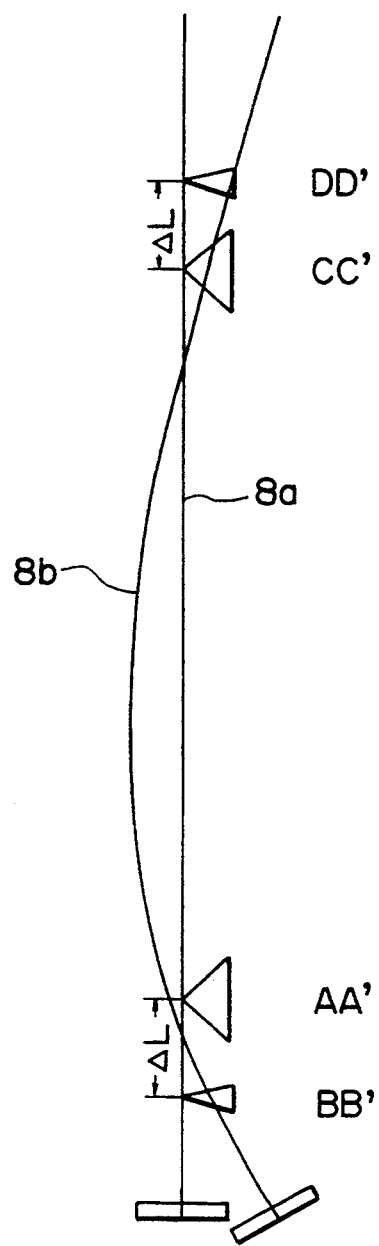
FIG. 4 is a diagram explaining a bending intrinsic vibration mode of a rotating shaft.
Figure 5A:
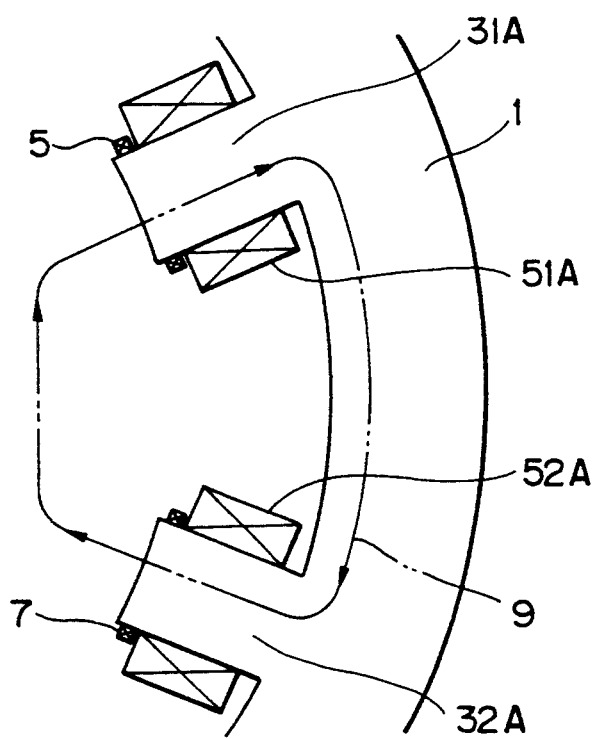
FIGS. 5a to c are diagrams illustrating control magnetic poles of a radial magnetic bearing apparatus as a first embodiment of the present invention.

DESCRIPTION OF THE PREFERRED EMBODIMENTS:

The preferred embodiments of a radial magnetic bearing apparatus of the present invention will be explained hereunder with reference to the drawings. In FIGS. 5a and c, FIGS. 6a and b, and FIG. 7, components like those in FIG. 1 to FIG. 4 are designated by like reference numerals or symbols.

Figure 5B:
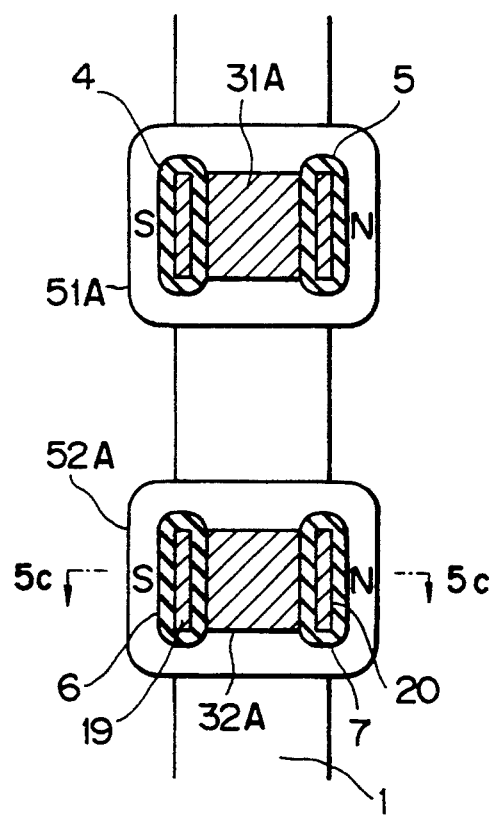
Figure 5C:
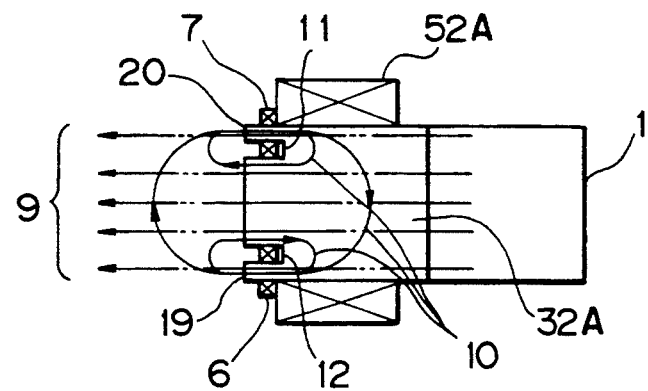

FIGS. 5a to c illustrate the structure of a first embodiment of a radial magnetic bearing apparatus to which the present invention is applied. FIG. 5a is a plan view of a part including adjacent two control magnetic poles 31A and 32A of such magnetic bearing apparatus, while FIG. 5b illustrates a diagram of the control magnetic poles 31A and 32A viewed from the center of the rotating shaft 8 and FIG. 5c is a sectional view of the control magnetic pole 32A taken along a line C—C of FIG. 5b.

In this embodiment shown in FIG. 5a to c, two circumferential grooves are formed at one end of respective control magnetic poles whereby tongue members which function as the sensor magnetic poles of an inductance-type displacement sensor are provided. Around these tongue members sensor coils are wound.

Specifically, as shown in FIGS. 5b and 5c, on the inner end surface of the control magnetic pole 32A a couple circumferential grooves 11 and 12 are formed to provide sensor magnetic poles 19 and 20 of the inductance-type displacement sensor. The sensor coils 6 and 7 are wound respectively around the sensor magnetic poles 19 and 20. As explained above, an inner end portion of the control magnetic pole 32A operates as the sensor magnetic poles 19 and 20 of the inductance-type displacement sensor. The control magnetic pole 31A is structured in the same manner as the control magnetic pole 32A and the sensor coils 4 and 5 are wound around corresponding sensor magnetic poles.

As shown in FIG. 5a, the control coils 51A and 52A wound around the corresponding control magnetic poles 31A and 32A are connected to form a pair of poles so that control magnetic fluxes 9 are generated by these coils in opposite directions to each other to form a closed magnetic path passing through the rotating shaft 8. As shown in FIG. 5c, the sensor coils 6 and 7 are connected in series so that closed magnetic paths 10 passing through the corresponding sensor magnetic poles 19 and 20 are formed to generate magnetic fields in the opposite directions; namely to form magnetic fields having different poles on the same ends of the sensor magnetic poles. Accordingly, the control magnetic flux 9 formed by the control coil 52A serves to cancel the magnetic flux generated by the sensor coil 6 and to be added to the magnetic flux generated by the sensor coil 7. Therefore, any influence of the control magnetic flux 9 can be neglected by connecting the sensor coils 6 and 7 in series. As a result, the inductance-type displacement sensor can be operated without being influenced by the control magnetic flux 9 even if a part of the control magnetic poles 32A is used as the sensor poles 19 and 20.

Figure 6B:
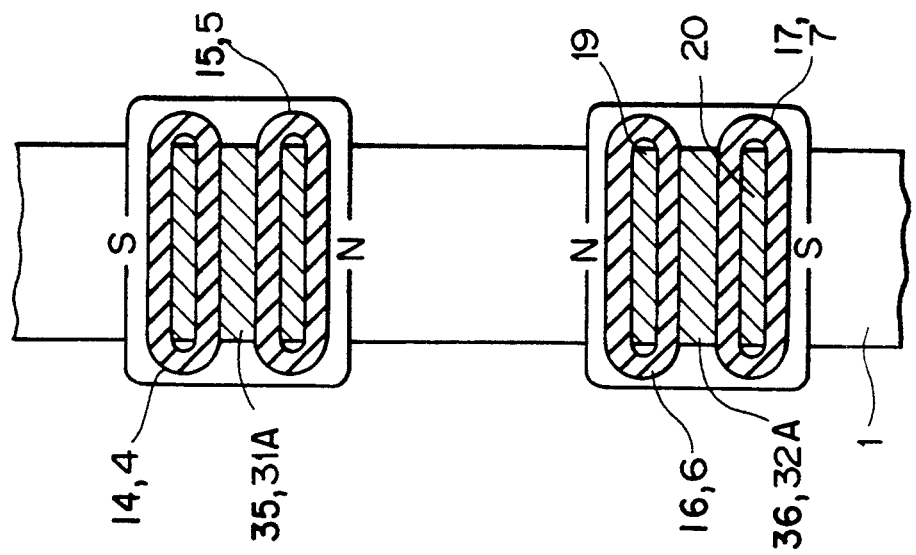
FIGS. 6a and b are diagrams illustrating control magnetic poles of a radial magnetic bearing apparatus as a second embodiment of the present invention.
Figure 6A:
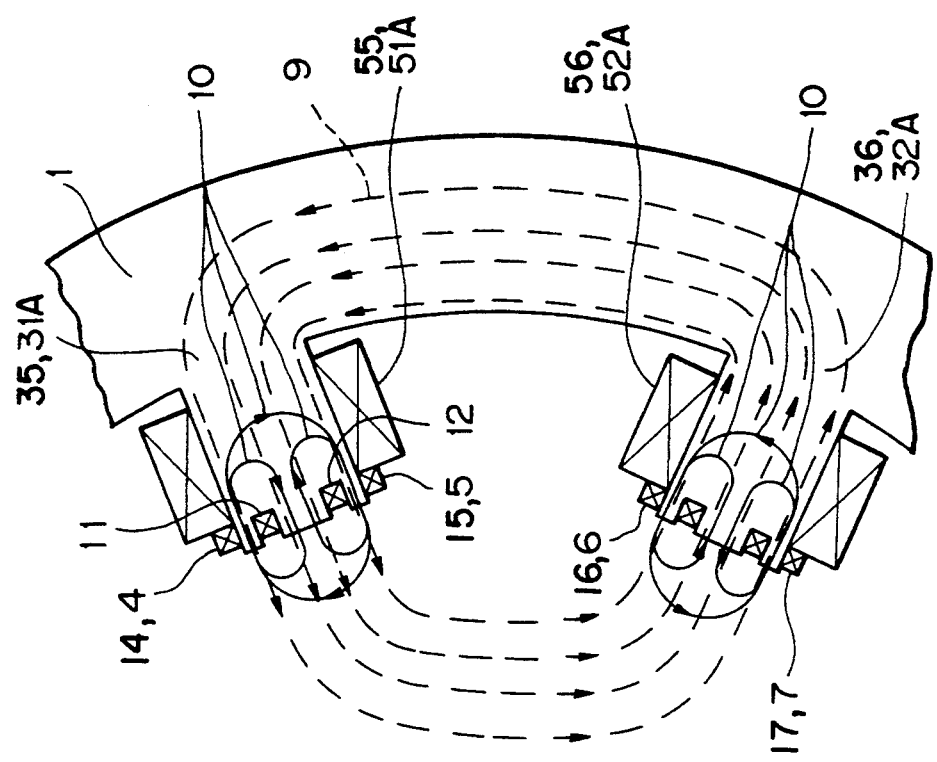

FIGS. 6a and b are diagrams illustrating the structure of control magnetic poles of a radial magnetic bearing apparatus of a second embodiment according to the present invention. FIG. 6a is a sectional view of a part of the control magnetic pole core 1 and FIG. 6b is a sectional view of the control magnetic poles 31A and 32A viewed from the rotating shaft. In this embodiment, inner end surface of each control magnetic pole 31A or 32A has two axial grooves 11 and 12 facing the rotating shaft 8, thereby forming tongue members which serve as the sensor magnetic poles 19 and 20 of the inductance-type displacement sensor and the sensor coils 16, 6 and 17, 7 are wound around the tongue members. As shown in FIGS. 6a and b, the sensor magnetic poles 19 and 20 are formed in the axial direction of the rotating shaft 8. These sensor magnetic poles operate in the same manner as those of the first embodiment shown in FIGS. 5a to c.

Figure 7:
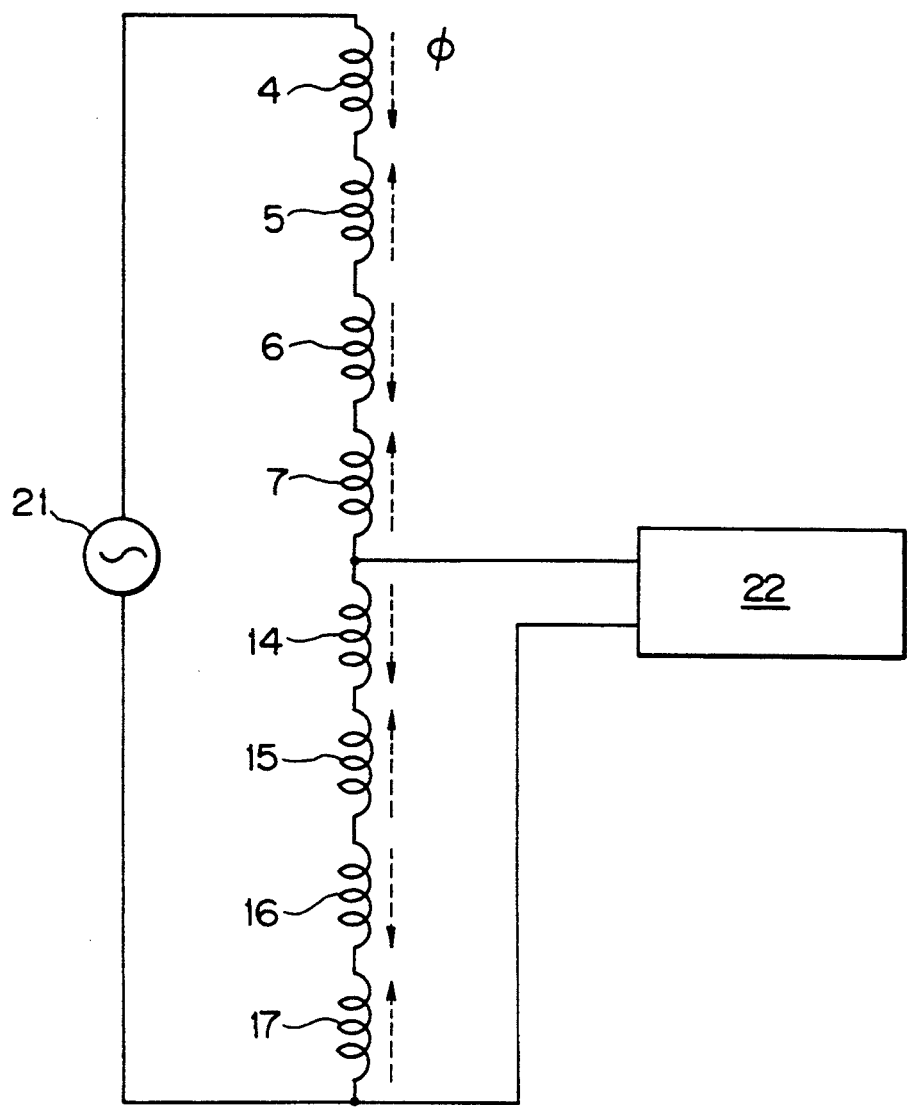
FIG. 7 is a diagram explaining electrical connection of the sensor coils in the embodiments of the present invention.

FIG. 7 is a diagram explaining electrical connection of sensor coils shown in FIGS. 5a to c and FIGS. 6a and b. The sensor coils 4, 5, 6, and 7 wound through respective grooves 11 and 12 formed on the control magnetic poles 31A and 32A are connected in series so that the magnetic fluxes are generated to pass through the corresponding control magnetic poles in the opposite directions with each other as indicated by the dotted lines, resulting in the generation of different magnetic poles on the same ends of the adjacent coils. On the other hand, the sensor coils 14, 15, 16 and 17 provided at a pair of control magnetic poles located in the direction X opposite to the magnetic poles 31 and 32 are also connected in series (not shown) so that the magnetic fluxes are generated in the opposite directions with each other at the corresponding control magnetic poles, resulting in the formation of different magnetic poles at the same ends of the adjacent coils. Further, the sensor coils 14–17 are connected in series with the sensor coils 4, 5, 6 and 7 provided at the control magnetic poles 31A and 32A. A voltage generated by an AC oscillator 21 is applied across the terminals of the sensor coils 4 to 7 and 14 to 17 connected in series. A neutral point of the series-connected sensor coils are connected to a sensor amplifier circuit 22. Therefore, if the rotating shaft 8 moves, for example, in the +X direction, a composite inductance of a group of the sensor coils 4, 5, 6 and 7 increases, while a composite inductance of a group of the sensor coils 14, 15, 16 and 17 decreases and a signal corresponding to a ratio of those inductances is input to the sensor amplifier circuit 22. According to such a circuit structure, since the position of the rotating shaft 8 can be determined by a ratio of an average inductance of the sensor coils 4, 5, 6 and 7 and that of the sensor coils 14, 15, 16 and 17, accurate displacement of the rotating shaft 8 can be detected.

In the present invention, it is noted that the sensor coils are electrically connected so that the magnetic fluxes generated by one sensor coil provided at one control magnetic pole and the adjacent sensor coil provided at the adjacent control magnetic pole form tile same polarity on the same sides of the sensor magnetic poles. For example, as shown in FIG. 5b, in the adjacent control magnetic poles 31A and 32A the sensor coils 5 and 7 are connected so that the sensor magnetic pole around which the sensor coil 5 is wound and the sensor magnetic pole around which the sensor coil 7 is wound form the pole N on the sides facing the rotating shaft 8. Similarly, in FIG. 6b, the adjacent sensor coils 5 and 6 wound at the ends of the control magnetic poles 31A and 32A are connected so that the pole N is formed on the same side of the respective sensor magnetic poles. As explained previously, the sensor coils provided at the same control magnetic pole are wound to generate magnetic fluxes in the reverse directions (different polarities). It is noted that leakage of magnetic fluxes to the outside of the sensor magnetic poles can be reduced by causing the adjacent sensor coils of the adjacent control magnetic poles to form the magnetic fluxes in the same direction, thereby forming the same polarity on the same side of the sensor magnetic poles.

In the first and second embodiments, a pair of grooves are provided on the inner end surfaces of control magnetic poles, but the number of such grooves may be reduced to one or increased to three or more. A more average position detection of an object can be realized by providing a plurality of grooves on the inner end surfaces of control magnetic poles and dispersing sensor coils.

As described heretofore, according to a magnetic bearing apparatus of the present invention, since the position of operating point of an inductance-type displacement sensor and that of a corresponding control pole are matched in the axial direction of a rotating shaft, namely, since the displacement sensor can detect the position of the rotating shaft at the operating point of the corresponding control pole, even if the rotating shaft is subjected to bending vibration, the magnetic bearing apparatus does not give rise to a problem of oscillation and the position of the rotating shaft can be controlled stably.

While the present invention has been described with reference to preferred embodiments thereof, it will be understood by those skilled in the art that the foregoing and other changes in form and detail can be made without departing from the spirit and scope of the invention.

What is claimed is:

1. A radial magnetic bearing apparatus for rotatably suspending an object made of a magnetic material by means of a magnetic attracting force, comprising:
   at least one control magnetic pole means disposed around the object for suspending the object and controlling a radial position thereof, each said control magnetic pole means having an end surface opposing to the object; and
   at least one displacement sensor means for detecting a radial position of the object, each said displacement sensor means comprising at least two sensor magnetic poles formed on said end surface of each said control magnetic pole means and sensor coils wound around the sensor magnetic poles;
   wherein said sensor coils provided at each said control magnetic pole means are connected in series to generate magnetic fields in opposite directions to each other.

2. A radial magnetic bearing apparatus as claimed in claim 1, wherein at least two grooves are provided on the end surface of each said control magnetic pole means in a rotational direction of the object to form the sensor magnetic poles.

3. A radial magnetic bearing apparatus as claimed in claim 1, wherein at least two grooves are provided on the end surface of each said control magnetic pole means in an axial direction of the object to form the sensor magnetic poles.

4. A radial magnetic bearing apparatus as claimed in claim 2, wherein said sensor coils provided on a first pair of adjacent two said control magnetic pole means are connected in series with said sensor coils provided on a second pair of adjacent two said control magnetic pole means located opposite to said first pair with respect to the object.

5. A radial magnetic bearing apparatus as claimed in claim 3, wherein said sensor coils provided on a first pair of adjacent two said control magnetic pole means are connected in series with said sensor coils provided on a second pair of adjacent two said control magnetic pole means located opposite to said first pair with respect to the object.

6. A radial magnetic bearing apparatus as claimed in claim 4, wherein adjacent two said sensor coils provided on adjacent two said control magnetic pole means are connected to generate a same polarity on a same side of adjacent two said sensor coils.

7. A radial magnetic bearing apparatus as claimed in claim 5, wherein any adjacent two said sensor coils provided on adjacent two said control magnetic pole means are connected to generate a same polarity on a same side of adjacent two said sensor coils.

* * * * *